United States Patent [19]

Nakagawa et al.

[11] 4,231,146
[45] Nov. 4, 1980

[54] METHOD OF MAKING A TIP FOR A BALL POINT PEN

[75] Inventors: Eishiro Nakagawa, Ageo; Taketoshi Miyamoto, Tokyo; Naozi Umino, Koshigaya; Hirosi Oyama, Soka, all of Japan

[73] Assignee: Pentel Kabushiki Kaisha, Tokyo, Japan

[21] Appl. No.: 12,553

[22] Filed: Feb. 15, 1979

Related U.S. Application Data

[62] Division of Ser. No. 776,372, Mar. 10, 1977, abandoned.

[30] Foreign Application Priority Data

Mar. 19, 1976 [JP] Japan .................................. 51-32283
Feb. 17, 1977 [JP] Japan .................................. 52-16449

[51] Int. Cl.³ ............................................. B23P 11/00
[52] U.S. Cl. ........................................ 29/432; 29/445; 29/441 BP; 29/522 R; 401/216
[58] Field of Search ........... 29/432, 445, 522, 441 BP, 29/525, 451; 401/216

[56] References Cited

U.S. PATENT DOCUMENTS

| | | | |
|---|---|---|---|
| 2,969,583 | 1/1961 | Schachter | 29/441 BP X |
| 3,048,148 | 8/1962 | Sirianni | 401/216 |
| 3,237,279 | 3/1966 | Kohlhagen et al. | 29/432 X |
| 3,584,101 | 6/1971 | Martz | 29/445 X |
| 3,641,659 | 2/1972 | Colgan et al. | 29/525 X |
| 3,959,061 | 5/1976 | Renck et al. | 29/451 X |
| 4,061,430 | 12/1977 | Herrning | 401/216 |

FOREIGN PATENT DOCUMENTS

| | | | |
|---|---|---|---|
| 978043 | 4/1951 | France | 401/216 |
| 1225648 | 7/1960 | France | 401/216 |
| 357003 | 10/1961 | Switzerland | 401/216 |
| 641469 | 5/1953 | United Kingdom | 401/216 |

Primary Examiner—Charlie T. Moon
Attorney, Agent, or Firm—Wenderoth, Lind & Ponack

[57] ABSTRACT

In a tip for a ball point pen including a cylindrical metallic tip body having a pointed end, a ball receiving hole having its opening at the pointed end of the tip body, a ball supporting seat of a plastic held in the bottom of the ball receiving hole, a bore for delivering ink to the ball receiving hole through the ball supporting seat and having its opening at the end of the tip body opposite to the pointed end, and a ball rotatably received within the ball receiving hole and supported on the seat, there is provided an improvement constituted by a recess formed in the bottom surface of the ball receiving hole, the recess having at least one angular portion, the ball supporting seat being deformed to fill all the corners of the bottom of the hole including the recess, thereby preventing the ball supporting seat from rotating in the bottom surface of the ball receiving hole. Further, by forming at least one protrusion in the vicinity of the upper edge around the recess, the rotation and the axial movement of the ball supporting seat can be prevented.

There is also provided a method of making such an improved tip for a ball point pen.

11 Claims, 16 Drawing Figures

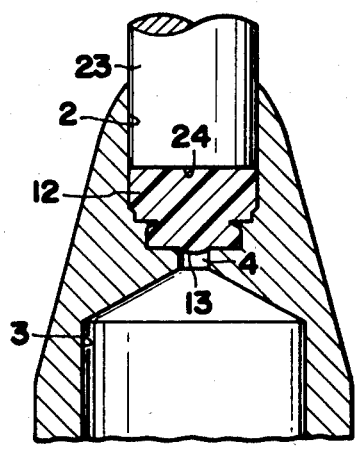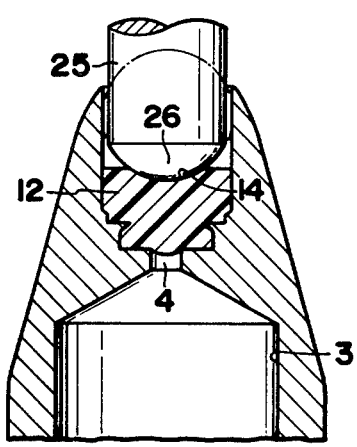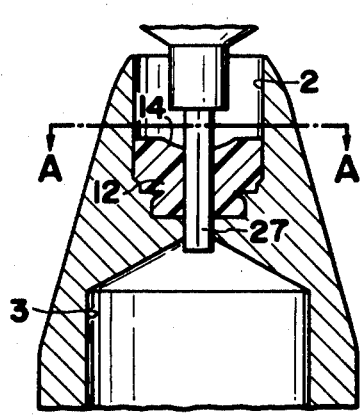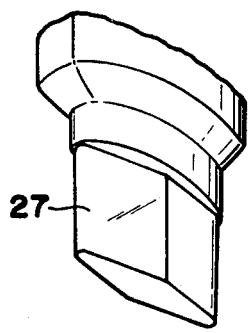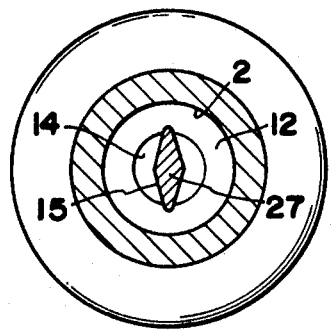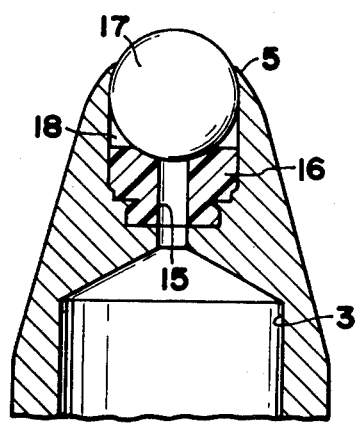

METHOD OF MAKING A TIP FOR A BALL POINT PEN

This is a Division of application Ser. No. 776,372, filed Mar. 10, 1977 now abandoned.

BACKGROUND OF THE INVENTION

The present invention relates to a tip of a ball point pen and, more particularly, to a writing tip including a ball rotatably received by a ball supporting seat of a plastic held within a ball receiving hole of a metallic tip body and to a method of making the same.

With the recent increase of the use of aqueous ink instead of oil based ink, it has become essential to use a ball supporting seat which is made of a plastic and precisely held in a ball receiving hole drilled at one end of a metallic tip body. When aqueous ink is applied to a ball point pen wherein the ball is directly supported by a bottom surface of the ball receiving hole, a breakage of thin film of the aqueous ink formed on the ball surface easily occurs when writing pressure is exerted on the ball, due to the relatively low viscosity of aqueous ink compared with that of oil ink. This causes undesirable noise and deterioration of the wear-resistance of the ball and the ball supporting surface. Such drawbacks are avoided by using a ball supporting seat of plastic which has a certain degree of elasticity.

The size of the ball used in current popular ball point pens is in general 1.0 mm, and is typically 0.5 mm or less in those pens for writing extremely thin lines. Therefore, the ball supporting seat of plastic must be correspondingly very small in size and very thin. At the same time, the seat must be firmly secured in the ball receiving hole of the tip body so as not to be moved, in order to ensure a smooth rotataion of the ball.

Although an effort has been made to firmly secure the ball supporting seat within the ball receiving hole by using an adhesive, such solution has been found inconvenient in that an excessive adhesive causes a clogging of ink flowing passage such as an ink guiding groove, while the mechanical bonding strength obtained thereby is not so large. In addition, it is quite difficult to insert the prefabricated supporting seat into the ball receiving hole, which makes the mass-production of the ball point pen difficult and troublesome.

SUMMARY OF THE INVENTION

It is therefore an object of the present invention to provide a ball point pen in which the ball supporting seat can be firmly secured in position by seat-retaining means provided in the ball receiving hole of the tip body to thereby prevent the rotation and/or the axial movement of the seat held in the ball receiving hole.

It is another object of the present invention to provide a method of making a tip for a ball point pen in which the formation of seat-retaining means in the ball receiving hole and the engagement of the means with the ball supporting seat, as well as the insertion of the seat into the ball receiving hole are simply and effectively accomplished.

In a prior art tip for a ball point pen, there is included a cylindrical metallic tip body having a pointed end, a ball receiving hole having its opening at the pointed end of the tip, a ball supporting seat of plastic held in the bottom of the ball receiving hole, a bore for delivering ink to the ball receiving hole through the ball supporting seat and having its opening at the end of the tip body opposite to the pointed end. A ball is rotatably received within the ball receiving hole and supported on the seat.

According to the improvement of the present invention, there is provided a recess in the bottom surface of the ball receiving hole. The recess should have at least one angular portion, and the ball supporting seat made of plastic is deformed to fill all the corners of the bottom of the hole including the recess, thereby preventing the ball supporting seat from rotating in the plane of the bottom surface of the ball receiving hole.

In the case when both the rotation and the axial movement must be prevented, at least one protrusion may further be formed in the vicinity of the upper edge around the recess. The ball supporting seat made of plastic is also deformed to fill all the corners of the bottom of the hole including the recess and behind the protrusion due to the plastic deformation. A recess in a circular form without any angular portion may be used when the recess and the protrusion are both provided.

Such recess and protrusion can be easily provided according to the method of the present invention. Namely, the bottom surface of the ball receiving hole is struck and depressed by means of the hammering action of a tool to thereby form a recess corresponding to the profile of the tool. The protrusion can be provided by using a hammering tool having at least one portion adapted to abut the upper edge around the recess. This tool hammers and depresses the abutted portion to thereby form the protrusion due to the reactionary deformation in the vicinity of the upper edge of the recess.

In the method of the present invention, the ball supporting seat can be easily and conveniently inserted into the bottom of the ball receiving hole, and firmly retained in position. The pointed end of the tip body is pressed strongly onto a sheet of plastic which is to constitute the ball supporting seat to cut out a portion of the plastic and transfer the cut out portion of the plastic into the opening of the ball receiving hole. The thus cut out portion of the plastics is then forced deep into the bottom of the hole to deform the portion to fill all the corners of the bottom of the hole including the recess and even behind the protrusion.

In order to form an ink guiding groove connecting the ball receiving hole and the ink delivering bore through the ball supporting seat, both a portion of the seat and the bottom of the hole are punched at the same time by using a punching cutter blade.

On the upper surface of the ball supporting seat is preferably formed a curved depression which acts as a ball supporting surface, on which the ball is rotatably seated.

The present invention will become more clear from the following description of preferred embodiments taken in conjunction with the accompanying drawings. Like numerals refer to like parts throughout.

BRIEF DESCRIPTION OF THE DRAWINGS

FIG. 8 is a sectional view showing the step of forcing the cut out ball supporting seat into the bottom of the ball receiving hole;

FIG. 9 is a sectional view showing the step of forming a curved depression on the upper surface of the seat;

FIG. 10 is a sectional view showing the step of punching the bottom of the ball receiving hole by using a punching cutter blade to form the ink guiding groove;

FIG. 11 is a perspective view of a preferred shape of the punching cutter blade;

FIG. 12 is a sectional view taken along line A—A of FIG. 10; and

FIG. 13 is a sectional view of the tip for a ball point pen completely assembled.

DETAILED DESCRIPTION OF THE PREFERRED EMBODIMENT

Figure 1:
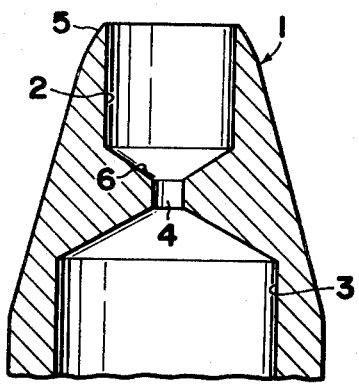
FIG. 1 is a sectional view of the tip body to which the present invention is applicable.

Referring now to FIG. 1, a tip body 1 used in the present invention is made of a rod-like cylindrical metallic material, e.g. stainless steel, having high corrosion and wear-resistant properties. The metallic material is first subjected to milling to form a frusto-conical shape to provide a pointed end 5, and after drilling a ball receiving hole 2 at one end of the cylindrical metallic material, the material is cut to a predetermined length required for manufacturing the tip body 1. Then a bore 3 for inserting a core, which delivers ink from an ink reservoir (not shown), is bored in the metallic material at the other end thereof to complete the tip body 1 having the pointed end 5. The thickness of the annular wall of the pointed end opening is typically about 0.03 mm.

It is preferred, in the present invention, to form a narrow passage 4 connecting the ball receiving hole 2 with the bore 3. Such passage 4 can be formed, for example, by drilling simultaneously with the drilling of the hole 2. The function of the passage 4 will be understood from the explanation hereinafter set forth.

Figure 2:
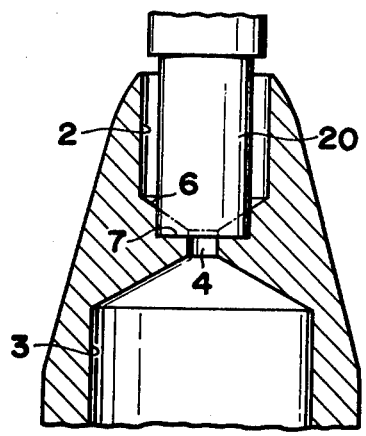
FIG. 2 is a sectional view showing the step of forming a recess in the bottom surface of the ball receiving hole of the tip body.

In general, as a result of the profile of the drill used in the drilling step described above, a conical inclined surface 6 is formed at the bottom of the hole 2. According to the present invention, a recess 7 is formed in this bottom surface 6, leaving a portion of the bottom surface 6 in the vicinity of the circumference thereof unrecessed (FIG. 2). The recess may be formed, after drilling the hole 2, by using a hammering tool 20, as shown in FIG. 2. The tool 20 is inserted into the previously drilled hole 2 so that the head portion of the tool 20 hammers and depresses the bottom surface 6 to form the recess portion 7 corresponding to the profile of the tool 20.

By forming such recess 7 in the bottom surface 6 of the hole 2, the rotation of a plastic ball supporting seat in a plane perpendicular to the longitudinal axis of the tip, which seat is to be inserted into and completely fill the bottom part of the hole 2 including the recess by the operational steps hereinafter described, is effectively prevented. Since the rotation of the seat is considered to accidentally cause clogging of the passage way for ink during the use of the ball point pen, the prevention of such rotation is necessary. In order to prevent the rotation effectively, the recess 7 is preferably formed to have at least one angular portion, rather than a circular recess which cannot prevent rotation of the ball supporting seat.

Figures 3A, 3B:
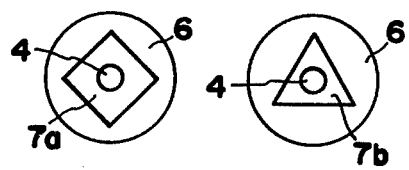
FIGS. 3a to 3d are plan views of the bottom surface of the ball receiving hole in which depressions of various shapes have been formed.
Figures 3C, 3D:
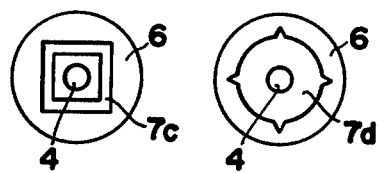

The recess may be, for instance, a triangular depression 7a as shown in FIG. 3a, a square depression 7b as shown in FIG. 3b, a square depression 7c having its central portion undepressed as shown in FIG. 3c, or a circular depression 7d having on its circumference a plurality of outward projections as shown in FIG. 3d. However, when protrusions are formed in portions close to the upper edge around the recess 7 in the operational step described below, the recess 7 and, accordingly, the head profile of tool 20 may be circular without any angular portion. When the recess is circular in shape, then it may be formed simultaneously with the drilling of the ball receiving hole 2.

Figure 4:
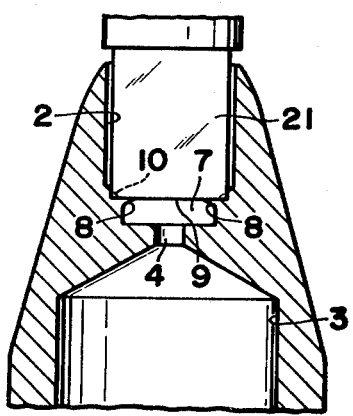
FIG. 4 is a sectional view showing the step of forming protrusions.
Figures 5, 6:
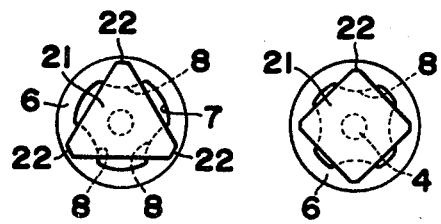
FIGS. 5 and 6 show configurations of protrusions formed at the upper edge of a circular recess by using a tool with a triangular and a square profile, respectively.

In order to provide seat-retaining means by which a more complete retaining effect, especially against the axial movement of the ball receiving seat, can be accomplished, it is preferred to perform a protrusion-forming step after the recess-forming step above described. In the protrusion-forming step, as shown in FIGS. 4–6, another hammering tool 21 is inserted in the ball receiving hole 2. This tool 21 is different from the tool 20 in that the peripheral edge of the head of the tool 21 has corners 22 adapted to abut the inclined conical surface 6 around the recess 7. As the head of the tool 21 strikes and presses the surface 6 around the recess 7, the portions of the surface 6 abutted by the corners 22 of the tool 21 are collapsed to form indentations 10 on the remaining unrecessed surface 6, and the reactionary deformation in the form of inward protrusions 8 is simultaneously produced in a plurality of portions close to the upper edge 9 around the recess 7, as will be seen from FIG. 4.

FIGS. 5 and 6 show configurations of protrusions 8 formed by using, for example, a triangular and a square head profile of the tools 21, respectively, over a circular recess 7. Although not shown in the drawings, it will be understood that a recess having angular portions, as exemplified by 7a, 7b, 7c, or 7d, may be acted on by recesses the tool 21 having a head profile of circular or angular shape, to form similar protrusions and indentations.

The indentations 10 are effective, as well as the recess 7, to prevent the rotation of the ball supporting seat.

Figure 7:
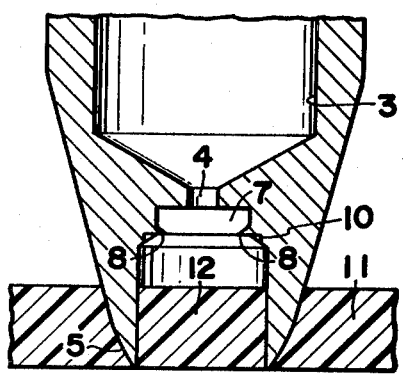
FIG. 7 is a sectional view showing the step of cutting a sheet of plastic constituting the ball supporting seat by using the pointed end of the tip body.

With the thus processed tip body 1, the next operational step is undertaken as shown in FIG. 7, wherein the pointed end 5 of the tip body 1 is pressed strongly onto a sheet 11 of a material which is to constitute the ball supporting seat, and is pulled in one direction to cut the sheet as if the pointed end 5 were a cutting knife. Alternatively, the sheet of plastic 11 may be pressed against the pointed end 5. The sheet material for use in the present invention should be a plastic having high wear-resistant and selflubricating properties, such as, for example, polyamide or poly acetal. Thus, the sheet 11 of plastic is cut and a portion 12 thereof is transferred into the tip body 1. The portion 12 of sheet 11 is closely fitted into the opening of the hole 2, conforming closely to the circumferential wall of the hole. The sheet 11 of plastic usually has a thickness of about 0.3 mm, so that the cutting by the pointed end 5 can be performed by putting a load of only about 7 to 8 kg on the sheet. This provides a much easier method for fitting the seat into the hole 2 of the tip body, as compared with the conventional method in which, for example, a preformed thin and round piece of plastic is inserted through the opening of the hole having a diameter of 0.6 mm. Moreover, the cutting by using the pointed end 5 can make the portion 12 of sheet conform closely to the shape of the hole 2.

In the next operational step shown in FIG. 8, a pusher rod 23 having a diameter corresponding to that of the hole 2 and having a flat pushing surface 24 is inserted into the hole 2 to force the plastic clogging the opening of the hole 2 deep into the hole. A further forcing of the pusher rod 23 causes a load of typically about 11 to 12 kg on the portion 12 of the plastic, so that the portion 12 is deformed due to the plastic deformation, and fills all the corners of the bottom portion of the hole 2 including the recess 7 and even behind the projections, as shown in FIG. 8. It will be noted that the diameter of the pusher rod 23 must be substantially equal to that of the hole 2, because otherwise the plastic will flow out around the rod 23 and inconveniently fill the space which is to provide a cavity 18 (in FIG. 13) for holding ink.

From observation of the condition of the thus-deformed plastic, by vertically cutting the tip body into two halves, it has been found that the plastic partly enters the narrow connecting passage 4, as denoted by 13 in FIG. 8. This phenomenon has a substantial significance in precision control of the projection of the ball in the final product. Namely, the degree of the projection of the ball is generally defined by the final position of the pusher rod 23 at the end of its compression stroke. Therefore, when the passage 4 is not provided, it is quite difficult to make the volume of the space including the recess 7 defined by the pusher rod 23 at the end of the stroke coincide with the volume of the portion 12 of plastic. On the contrary, when the passage 4 is provided and the plastic is allowed to partly enter the passage 4, then such coincidence can easily be obtained. Subsequent to the pushing step by using the rod 23 as above-described, another pusher rod 25 having an end 26 rounded with a curvature equal to that of the ball is inserted and pressed onto the upper surface of the portion 12 of the plastic 12 to form a curved depresion which constitutes a ball supporting surface 14, as shown in FIG. 9. This step of forming the ball supporting surface 14 is preferably repeated once more after the subsequent step of punching described below.

In the next operational step shown in FIG. 10, both the plastic 12 and the bottom portion of the hole 2 are punched together by shearing by using a punching cutter blade 27 made of a hard metal, to thereby form a groove 15 for guiding ink. The passage 4 serves to reduce, to some extent, the load required for punching. However, when the profile of the opening made by the cutting or punching becomes longer, a larger load will be required for punching. Too large a cross-sectional area of the ink guiding groove 15 will inconveniently reduce the area of the ball supporting surface 14. The supply of ink will be smooth when the width of the ink guiding groove 15 is sufficiently small, due to the capillary action. However, the punching blade 27 required for cutting such a small groove must be correspondingly small and is more likely to be damaged. Thus, the cross-section of the punching blade 27 is preferably shaped, as shown in FIG. 11, to have a large stiffening or strengthening thickness at its middle portion and to have gradually tapering ends. The configuration of the ball supporting surface 14 and the ink guiding groove 15 punched by the blade 27 is clearly shown in FIG. 12. As a matter of fact, the smaller width of the blade is typically about 0.1 mm.

It is to be noted that the protrusions 8 effectively prevent the ball supporting seat from being axially moved during the extraction of the punching blade 27. Such function of the protrusions 8 has a substantial significance in maintaining the precision of the projection of the ball from the opening of the ball receiving hole 2 in the final product, and completely obviates the inconvenience that the ball supporting seat is axially moved to accidentally clog the passage for the ink during the use of the ball point pen.

Hereinafter, the portion 12 of plastic the punched ink guiding groove 15 therein is referred to as the "ball supporting seat" and is denoted by a numeral 16.

After the ink guiding groove has been formed by punching, the ball 17 is mounted on the ball supporting seat 16. Then, the pointed end 5 of the tip body 1 is shrunk around the ball 17, by a well-known and conventional method, to embrace the ball within the ball receiving hole 2. The thus completed tip of the ball point pen is shown in FIG. 13 in which a numeral 18 denotes a cavity constituting an ink reservoir, the function thereof being well-known in the art.

As will be understood from the description hereinbefore, the ball supporting seat of plastic is firmly retained by means of the recess, protrusions and indentations. As a result, the ball supporting seat is never rotated, and is never axially moved during processing, as well as after the complete assembly, so that a good relationship between the ball and the ball supporting surface is maintained.

Furthermore, since protrusions may be positioned in the vicinity of the upper edge of the recess formed at the bottom of the hole, such protrusions can readily be formed by hitting the bottom surface around the recess by using the hammering tool.

In addition, the insertion of the ball supporting seat into the ball receiving hole of the tip body can easily be accomplished by cutting the sheet of plastic for the supporting seat by using the pointed end of the tip body.

Further, the improved retaining of the ball supporting seat by the recess, protrusions and indentations can positively be provided by utilizing the plastic deformation of the plastic.

It should be apparent that the various modifications to the present invention may be made by those skilled in the art. For example, although the bottom surface of the ball receiving hole has been shown in the drawings as a conical inclined surface, it will obviously be understood that a flat bottom surface may similarly be usable.

We claim:

1. In a method of making a tip for a ball point pen including forming a cylindrical metallic tip body having a pointed end, a ball receiving hole having the opening thereof at the pointed end of the tip body and a bore for delivering ink to the ball receiving hole and having the opening thereof at the end of the tip body opposite to the pointed end, inserting a ball supporting seat of a plastic into the bottom of the ball receiving hole, putting a ball on the ball supporting seat in the ball receiving hole, and forming the pointed end of the tip body over the ball for holding the ball in the tip body; the improvement comprising the steps of, after forming the tip body, forming a recess in the bottom surface of the ball receiving hole, said recess having at least one angular portion, applying the pointed end of the tip body onto a sheet of a plastic for the ball supporting seat to thereby cut out a portion of the plastic and transfer said portion of the plastic to the opening of the ball receiving hole, forcing the thus cut out portion of the plastic deep into the bottom of the ball receiving hole and deforming the portion of the plastic to fill all the corners of the bottom of the hole including said recess, punching both a portion of the ball supporting seat and the bottom of the hole at the same time thereby forming an ink guiding groove between the ball receiving hole and the ink delivering bore through the ball supporting seat, and then putting the ball on the ball supporting seat.

2. The method according to claim 1, which further comprises, prior to inserting the ball supporting seat, forming a narrow pasage between the ball receiving hole and the ink delivering bore.

3. The method according to claim 1, wherein said recess is formed by using a hammering tool which hammers and depresses the bottom surface of the ball receiving hole.

4. The method according to claim 1, wherein said punching step is carried out by using a punching cutter blade, a transverse section of which has a large thickness at the middle portion thereof for stiffening the blade and gradually tapered toward the opposite ends.

5. The method according to claim 1, which further comprises, after inserting the ball supporting seat, forming a curved depression on the upper surface of the ball supporting seat of the plastic which acts as a ball supporting surface.

6. In a method of making a tip for a ball point pen including forming a cylindrical metallic tip body having a pointed end, a ball receiving hole having the opening thereof at the pointed end of the tip body and a bore for delivering ink to the ball receiving hole and having the opening thereof at the end of the tip body opposite to the pointed end, inserting a ball supporting seat of a plastic into the bottom of the ball receiving hole, putting a ball on the ball supporting seat in the ball receiving hole, and forming the pointed end of the tip body over the ball for holding the ball in the tip body; the improvement comprising the steps of, after forming the tip body;

forming a recess in the bottom surface of the ball receiving hole, forming at least one protrusion in the vicinity of the upper edge of said recess, applying the pointed end of the tip body onto a sheet of a plastic for the ball supporting seat to thereby cut out a portion of the plastic and transfer said portion of the plastic to the opening of the ball receiving hole, forcing the thus cut out portion of the plastic deep into the bottom of the ball receiving hole and deforming the portion of the plastic to fill all the corners of the bottom of the hole including said recess and behind the protrusion, punching both a portion of the ball supporting seat and the bottom of the hole at the same time thereby forming an ink guiding groove between the ball receiving hole and the ink delivering bore through the ball supporting seat, and then putting the ball on the ball supporting surface.

7. The method according to claim 6, which further comprises, prior to inserting the ball supporting seat, forming a narrow passage between the ball receiving hole and the ink delivering bore.

8. The method according to claim 6, wherein said recess is formed by using a hammering tool which hammers and depresses the bottom surface of the ball receiving hole.

9. The method according to claim 6, wherein said protrusion is formed by using a hammering tool having at least one portion adapted to abut the upper edge around the recess, said tool hammering and the abutted portion of the upper edge around the recess for forming the protrusion.

10. The method according to claim 6, wherein said punching step is carried out by using a punching cutter blade, a transverse section of which has a large thickness at the middle portion thereof for stiffening the blade and gradually tapered toward the opposite ends.

11. The method according to claim 6, which further comprises, after inserting the ball supporting seat, forming a curved depression on the upper surface of the ball supporting seat of the plastic which acts as a ball supporting surface.

* * * * *